(12) United States Patent
Sheng et al.

(10) Patent No.: US 6,822,380 B2
(45) Date of Patent: Nov. 23, 2004

(54) FIELD-ENHANCED MIS/MIM ELECTRON EMITTERS

(75) Inventors: Xia Sheng, Los Altos, CA (US);
Henryk Birecki, Palo Alto, CA (US);
Si-Ty Lam, Pleasanton, CA (US);
Huei-Pei Kuo, Cupertino, CA (US);
Steven Louis Naberhuis, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 09/975,296

(22) Filed: Oct. 12, 2001

(65) Prior Publication Data

US 2003/0071555 A1 Apr. 17, 2003

(51) Int. Cl.[7] ................................................ H01J 1/312
(52) U.S. Cl. .................... 313/310; 313/336; 313/346 R
(58) Field of Search ................................ 313/310, 336, 313/351, 309, 346 R, 346 DC; 438/20

(56) References Cited

U.S. PATENT DOCUMENTS

| | | | |
|---|---|---|---|
| 3,581,151 A | * 5/1971 | Boyle et al. | 313/346 R |
| 3,717,790 A | * 2/1973 | Dalton et al. | 313/367 |
| 5,557,596 A | 9/1996 | Gibson et al. | 369/101 |
| 5,599,749 A | 2/1997 | Hattori et al. | 437/228 |
| 5,619,092 A | 4/1997 | Jaskie | 313/309 |
| 5,908,699 A | 6/1999 | Kim | 428/408 |
| 5,932,962 A | 8/1999 | Nakatani et al. | 313/495 |
| 6,037,606 A | 3/2000 | Ema | |
| 6,187,603 B1 | 2/2001 | Haven et al. | 438/20 |
| 6,204,595 B1 | 3/2001 | Falabella | 313/308 |

FOREIGN PATENT DOCUMENTS

| | | |
|---|---|---|
| EP | 0367195 | 5/1990 |
| EP | 0878819 A2 | 11/1998 |
| EP | 1056110 A1 | 11/2000 |
| EP | 1117118 A1 | 7/2001 |
| JP | 62272421 | 11/1987 |
| JP | 2001110300 | 4/2001 |

* cited by examiner

Primary Examiner—Nimeshkumar D. Patel
Assistant Examiner—Sharlene Leurig

(57) ABSTRACT

In an electron emitter based on Metal-Insulator-Semiconductor or Metal-Insulator-Metal emitters, field emission structures are enclosed within the emitter structure. The electron emitter may include a conductive substrate and an electron supply layer formed on the conductive substrate. The electron supply layer, for example undoped polysilicon, has protrusions formed on its surface. The sharpness and density of protrusions may be controlled. Above the electron supply layer and the protrusions, an insulator may be formed thereby enclosing the protrusions. A top conductive layer may be formed above the insulator. The enclosed protrusions are relatively insensitive to vacuum contamination. The thinness of the insulator allows high intensity electric fields at the protrusions to be generated with low applied voltage. Field-enhanced injection of electrons into the insulator and thence through the top conductive layer results. Furthermore, electron beam dispersion and divergence are minimized.

43 Claims, 6 Drawing Sheets

FIELD-ENHANCED MIS/MIM ELECTRON EMITTERS

FIELD OF THE INVENTION

This invention relates generally to electron emitters. In particular, the invention relates generally to field-enhanced Metal-Insulator-Semiconductor (MIS) or Metal-Insulator-Metal (MIM) electron emitters, hereinafter collectively referred to as FEMIS.

BACKGROUND OF THE INVENTION

Electron emission technology exists in many forms today. For example, cathode ray tubes (CRT) are prevalent in many devices such as TVs and computer monitors. Electron emission plays a critical role in devices such as x-ray machines and electron microscopes. In addition, microscopic cold cathodes can be employed in electron-beam lithography used, for example, in making integrated circuits, in information storage devices such as those described in Gibson et al, U.S. Pat. No. 5,557,596, in microwave sources, in electron amplifiers, and in flat panel displays. Actual requirements for electron emission vary according to application. In general, electron beams need to deliver sufficient current, be as efficient as possible, operate at application-specific voltages, be focusable, be reliable at the required power densities, and be stable both spatially and temporally at a reasonable vacuum for any given application. Portable devices, for example, demand low power consumption.

Metal-Insulator-Semiconductor (MIS) and Metal-Insulator-Metal (MIM) electron emitter structures are described in Iwasaki, et al, U.S. Pat. No. 6,066,922. In such structures with the application of a potential between the electron supply layer and the thin metal top electrode, electrons are 1) injected into the insulator layer from the electron supply layer (metal or semiconductor), 2) accelerated in the insulator layer, 3) injected into the thin metal top electrode, and 4) emitted from the surface of the thin metal top electrode. Depending upon the magnitude of the potential between the electron supply and thin metal top electrode layers, such emitted electrons can possess kinetic energy substantially higher than thermal energy at the surface of the thin metal film. Hence, these emitters may also be called ballistic electron emitters.

Shortcomings of MIS or MIM devices include relatively low emission current densities (typically about 1 to 10 $mA/cm^2$) and poor efficiencies (defined as the ratio of emitted current to shunt current between the electron supply layer and the thin metal electrode) (typically approximately 0.1%).

Electrons may also be emitted from conducting or semiconducting solids into a vacuum through an application of an electric field at the surface of the solid. This type of electron emitter is commonly referred to as a field emitter. Emitted electrons from field emitters possess no kinetic energy at the surface of the solid. The process for making tip-shaped electron field emitters, hereinafter referred to as Spindt emitters, is described in C. A. Spindt, et al, "Physical Properties of Thin-Film Field Emission Cathodes with Molybdenum Cones", Journal of Applied Physics, vol. 47, No. 12, December 1976, pp. 5248–5263. For a Spindt emitter, the electron-emitting surface is shaped into a tip in order to induce a stronger electric field at the tip surface for a given potential between the tip surface and an anode; the sharper the tip, the lower the potential necessary to extract electrons from the emitter.

The shortcomings of Spindt emitters include requiring a relatively hard vacuum (pressure $<10^{-6}$ Torr, preferably $<10^{-8}$ Torr) to provide both spatial and temporal stability as well as reliability. Furthermore, the angle of electron emission is relatively wide with Spindt emitters making emitted electron beams relatively more difficult to focus to spot sizes required for electron-beam lithography or information storage applications. Operational bias voltages for simple Spindt tips are relatively high, ranging up to 1000 volts for a tip-to-anode spacing of 1 millimeter.

In other words, combining high current density, stability, and reliability in one device has been difficult, if not impossible, with previous designs of electron emitters.

SUMMARY OF THE INVENTION

In one aspect, an embodiment of a FEMIS electron emitter may include an electron supply structure. The electron supply structure is such that at least one protrusion, preferably a plurality of protrusions, may be formed on a top side of the electron supply structure. The electron supply structure may be formed from a conductive substrate and optionally an electron supply layer formed above the conductive substrate. The electron emitter may also include an insulator formed above the electron supply structure and protrusion(s). In this manner, any given protrusion becomes internal to the electron emitter structure. The electron emitter may further include a top conductive layer formed above the insulator.

The FEMIS electron emitter may be such that a portion of the insulator above any given protrusion is thinner than a portion of the insulator that is above the relatively flat region of the electron supply structure. Additionally the insulator may be shaped to curve inward on both lower and upper sides near any given protrusion, i.e., the insulator may be hourglass-shaped locally. The insulator can also be substantially conformal to the electron supply layer, i.e., have the shape of the surface of the electron supply layer including protrusions prior to the formation of the insulator.

In another aspect, an embodiment of a method of forming an FEMIS electron emitter may include forming an electron supply structure. The electron supply structure is such that at least one protrusion, preferably a plurality of protrusions, may be formed on a top side of the electron supply structure. The electron supply structure may be formed from a conductive substrate and optionally from an electron supply layer formed above the conductive layer substrate. The method may also include forming an insulator above the electron supply structure and protrusion(s). In this manner, any given protrusion becomes internal to the electron emitter structure. The method may further include forming a top conductive layer above the insulator.

Certain embodiments of the present invention may be capable of achieving certain aspects. For example, because any given protrusion is internal to the emitter structure, it is not exposed to vacuum. Thus, the emitter is relatively insensitive to the contaminants that may exist in the vacuum, a situation that helps to prolong the life and efficiency of the emitter as well as to promote the spatial and temporal stability of the electron beam emitted. Consequently, vacuum requirements can be substantially relaxed.

Moreover, the shape of any given protrusion coupled with a relatively thin insulator gives rise to an enhanced electric field at that protrusion when a voltage is applied between the conductive substrate and the top conductive layer. Relatively low operational voltages are therefore possible with FEMIS electron emitters. The electric field away from any given protrusion is relatively low thereby improving the reliability of the entire emitter structure. Current densities and efficiencies from FEMIS electron emitters can be relatively high. The electron beam from a FEMIS emitter is also relatively easy to focus.

BRIEF DESCRIPTION OF THE DRAWINGS

Features of the present invention will become apparent to those skilled in the art from the following description with reference to the drawings, in which:

FIGS. 2A and 2B illustrate exemplary cross sections of third and fourth embodiments of an electron emitter according to an aspect of the present invention;

DETAILED DESCRIPTION

For simplicity and illustrative purposes, the principles of the present invention are described by referring mainly to exemplary embodiments thereof. However, one of ordinary skill in the art would readily recognize that the same principles are equally applicable to many types of electron emitters.

Figure 1A:
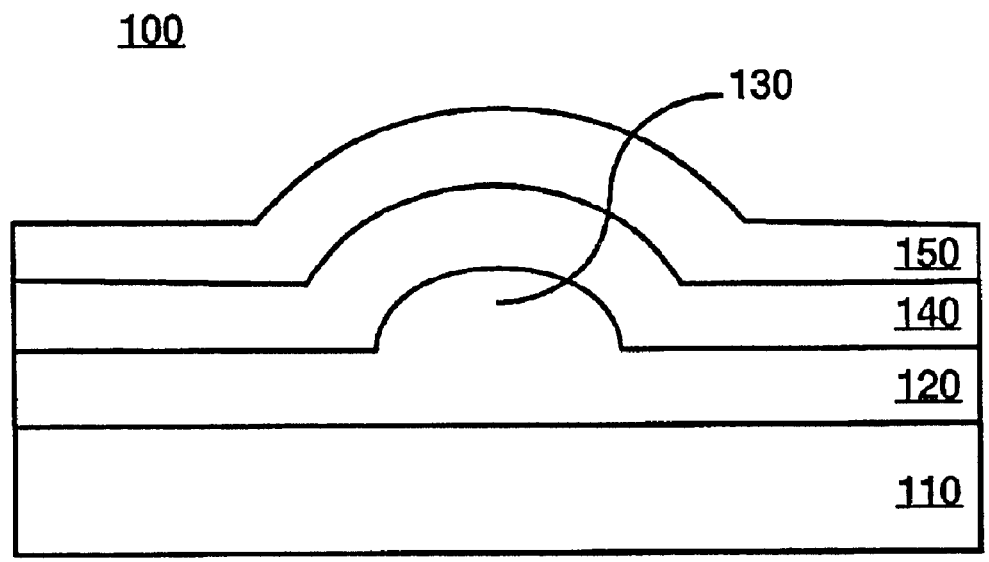
FIGS. 1A and 1B illustrate exemplary cross sections of first and second embodiments of an electron emitter according to an aspect of the present invention.
Figure 1B:
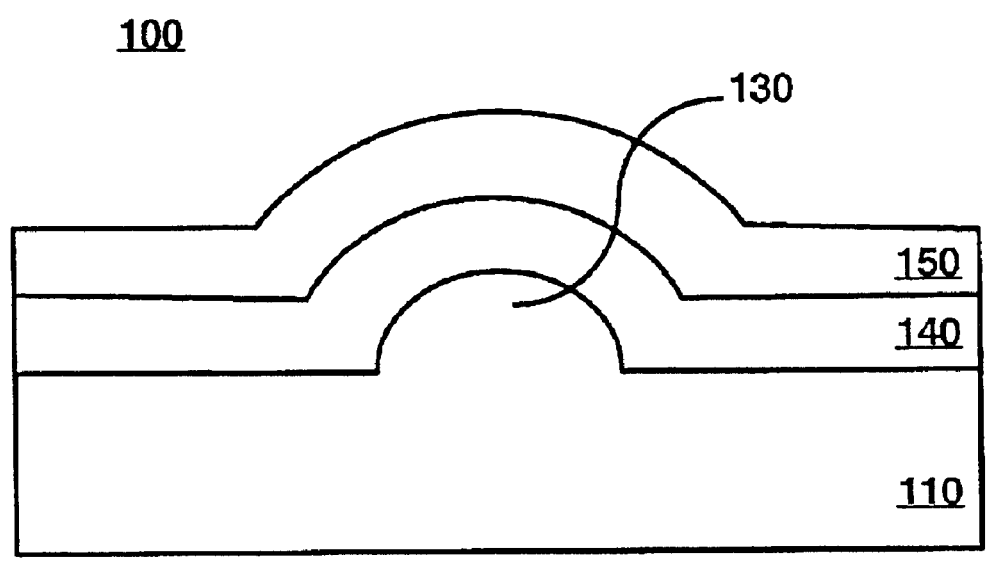

FIGS. 1A and 1B illustrate cross sections of first and second embodiments of an exemplary FEMIS electron emitter 100 according to an aspect of the present invention. As shown, the electron emitter 100 may include a conductive substrate 110. The conductive substrate 110 may be formed from metal (aluminum, tungsten, titanium, copper, gold, tantalum, platinum, iridium, palladium, rhodium, chromium, magnesium, scandium, yttrium, vanadium, zirconium, niobium, molybdenum, silicon, beryllium, hafnium, silver, and osmium and any alloys, and multilayered films thereof); doped polysilicon; doped silicon; graphite; metal-coated glass, ceramic, or plastic; indium-tin-oxide (ITO) coated glass, ceramic, or plastic; and the like. The metal or ITO coatings may be patterned or unpatterned. The top surface of the conductive substrate may be planarized using generally accepted methods such as chemical-mechanical polishing (CMP).

Above the conductive substrate 110, the electron emitter 100 may also include an electron supply layer 120 as shown in FIG. 1A. As shown in FIG. 1B, the electron supply layer 120 is not necessary to practice the invention. A protrusion 130 may be formed on a top side of the electron supply layer 120 (see FIG. 1A) or on a top side of the conductive substrate 110 (see FIG. 1B). There may be many of these protrusions 130 included in the electron emitter 100. The sharpness of any given protrusion 130 may be controlled in the fabrication process. As a result, the current output per protrusion 130 may be obtained at relatively lower voltages according to Fowler-Nordheim emission statistics.

The density of the protrusions 130 may also be controlled. For example, densities of several hundred protrusions 130 per square micrometer can be obtained. Consequently the total emission current can be controlled. Since any given protrusion 130 may be capable of delivering a given current in the limit, higher current may be delivered by increasing the number of protrusions 130 per emission area. Since the current can be related to voltage applied between the conductive substrate 110 and a top conductive layer 150 through the Fowler-Nordheim equation, control voltages, hence power, can be adjusted downward depending upon application.

The electron supply layer 120, including the protrusion(s) 130 of the electron emitter 100, may be formed from a semiconductor, such as polysilicon, that may or may not be doped. In a preferred embodiment, the polysilicon may be undoped. If n-type doping is preferable, the level of doping along a depth of the electron supply layer 120 may be varied to tailor electron transport. In addition, the doping may be confined to given areas through the use of masks.

The formation of the protrusion(s) 130 may be accomplished through the growth of hemispherical grain (HSG) polysilicon as part of the process in forming the polysilicon comprising the electron supply layer 120 or the conductive substrate 110. Alternatively, the growth of protrusion(s) 130 may be effected by seeding the growth of HSG polysilicon in subsequent processes. HSG polysilicon is described in M. Yoshimaru, et al, "Rugged surface poly-Si electrode and low temperature deposited Si3N4 for 64 Mbit and beyond STC DRAM cell", Tech. Digest, 1990 International Electron Devices Meeting, San Francisco, Dec. 9–12, 1990, paper 27.4, pp. 659–662.

The electron emitter 100 may further include an insulator 140 formed above the electron supply layer 120 or the conductive substrate 110 including the protrusion(s) 130. In this manner, the protrusion(s) 130 becomes internal to the structure of the electron emitter 100, and the protrusion(s) 130 is not exposed to vacuum. The insulator 140 may be formed from materials such as the oxides, nitrides, and oxynitrides of silicon, aluminum, titanium, tantalum, tungsten, hafnium, zirconium, vanadium, niobium, molybdenum, chromium, yttrium, scandium, nickel, cobalt, beryllium, magnesium, and combinations thereof. The insulator may also be formed from diamond-like carbon. However, one of ordinary skill will realize that the list of materials is not exhaustive. Indeed, the insulator 140 may be formed by oxidizing a top portion of the electron supply layer 120.

The insulator 140 may be formed such that the insulator 120 is substantially conformal with the electron supply layer 120 or the conductive substrate 110 including protrusion(s) 130. The lower bound on the thickness of the insulator 140 may be largely determined by the potential between the electron supply layer 120 and the top conductive layer 150 that is sufficient to overcome the work function of the top conductive layer 150, which is typically 4 to 6 electron volts (eV). Breakdown voltage of the insulator 140 at any given thickness and the work function of the top conductive layer 150 therefore dictate the lower bound on the thickness of the insulator 140. The upper bound on the thickness of the insulator 140 may be determined by the potential necessary to cause electron transport in the insulator 140. The thicker the insulator 140 is; the higher the required potential.

The thinness of the insulator 140 near any given protrusion 130 and the shape of any given protrusion 130 allows a relatively large electric field to be generated at relatively low applied bias voltages between the conductive substrate 110 and the top conductive layer 150. For the example of an FEMIS emitter formed of undoped polysilicon and an insulator thickness of 25 nm, only about a 6 volt bias needs to be applied to generate a sufficient electric field to give rise to electron emission by overcoming the work function of the top conductive layer 150. For typical Spindt emitters without extraction electrodes and a tip-to-anode spacing of 1 mm, the applied potential would be approximately 1,000 Volts.

Additionally, the electron emitter 100 may include the top conductive layer 150 formed above the insulator 140. The top conductive layer 150 may be formed from metal (aluminum, tungsten, titanium, molybdenum titanium, copper, gold, silver, tantalum, platinum, iridium, palladium, rhodium, chromium, magnesium, scandium, yttrium, vanadium, zirconium, niobium, molybdenum, hafnium, silver, and osmium and any alloys or multilayered films), doped polysilicon, graphite, etc. or combinations of metal and non-metal, e.g., conductive carbon, films. When exposed to air the outer surface of the top conductive layer 150 is preferred to not oxidize to an insulating native oxide.

To operate the FEMIS electron emitter 100, a bias voltage is applied between the conductive substrate 110 and the top conductive layer 150. During operation, electrons transported through the conductive substrate 110 (and the electron supply layer 120) tunnel through the insulator 140 near any given protrusion 130 and are emitted from the top conductive layer 150.

Figures 2A, 2B:
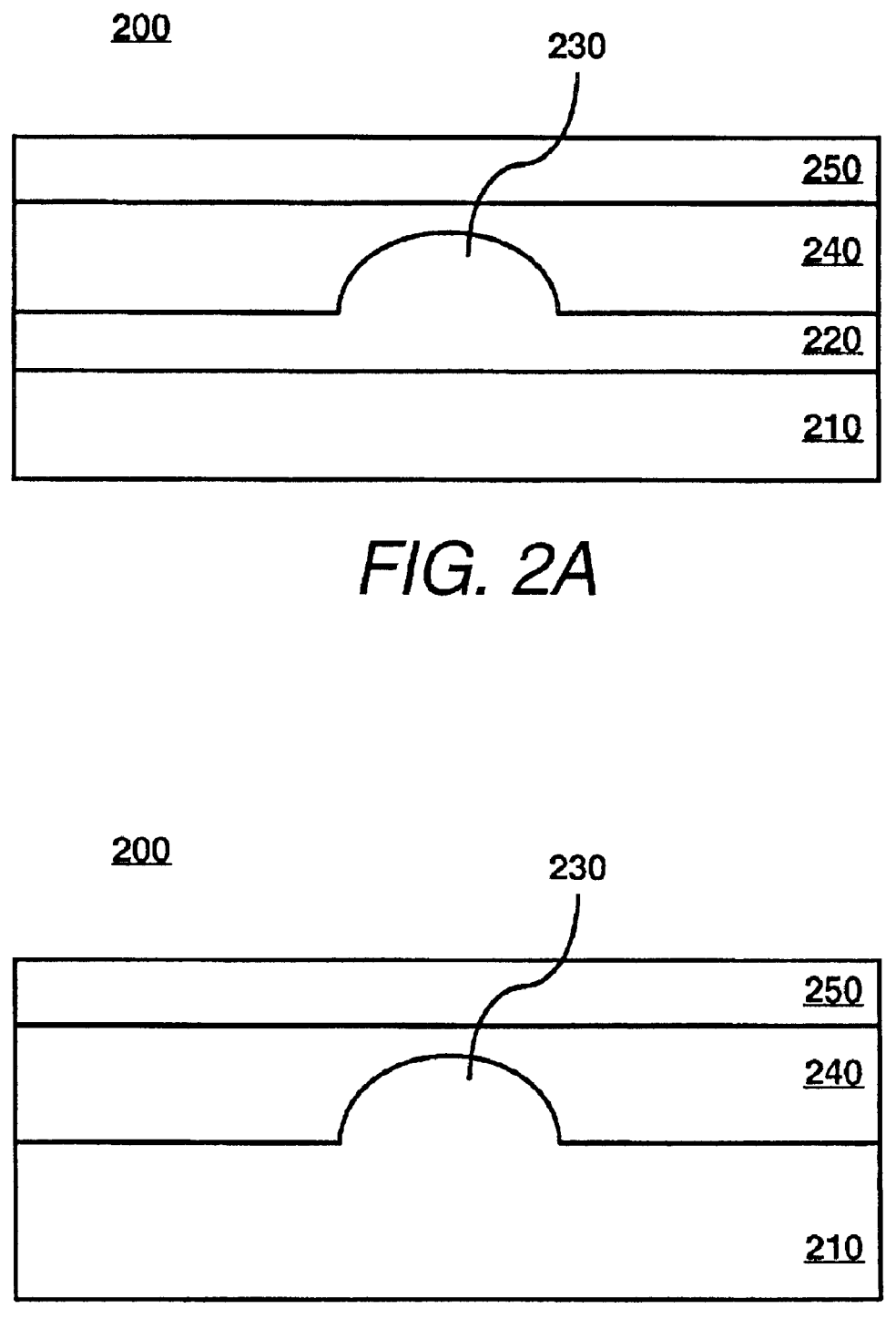

FIGS. 2A and 2B illustrate cross sections of third and fourth embodiments of an exemplary FEMIS electron emitter 200 according to an aspect of the present invention. The third and fourth embodiments may include many of the same features described herein with respect to first and second embodiments, respectively, of FIGS. 1A and 1B. For example, the electron emitter 200 may include a conductive substrate 210 (with at least one protrusion 230, see FIG. 2A), optionally an electron supply layer 220 with at least one protrusion 230 (see FIG. 2B), an insulator 240, and a top conductive layer 250. Only those elements distinguishable between the embodiments are described.

Regarding the electron emitter 200, the insulator 240 may be formed such that the insulator 240 near any given protrusion 230 is relatively thinner than the insulator 240 on regions of the electron supply layer 220 that are substantially flat. For example, the thickness of the insulator 240 near the protrusion 130 may be between 5–300 nanometers (nm), but may be 30–325 nm thick in the substantially flat region assuming that the protrusion(s) 230 protrudes 25 nm above the substantially flat regions of the electron supply layer 220. In this third and fourth embodiments, the outer surface of the insulator 240 is relatively flat. Focusing of the emitted electron beam may be improved with such structure through control of electron beam divergence. The same arguments with respect to limits on the thickness of the insulator 240 above the protrusion(s) 230 still pertain.

Figure 3A:
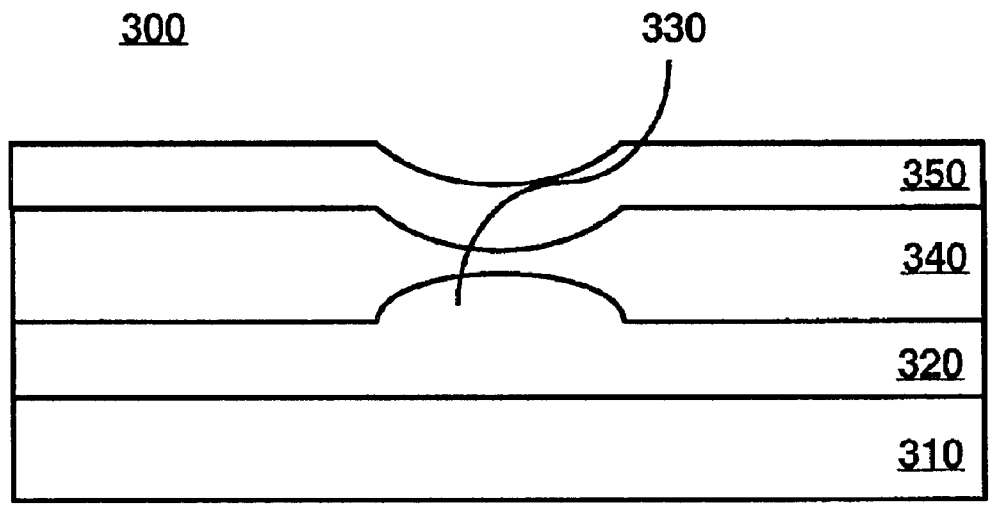
FIGS. 3A and 3B illustrate exemplary cross sections of fifth and sixth embodiments of an electron emitter according to an aspect of the present invention.
Figure 3B:
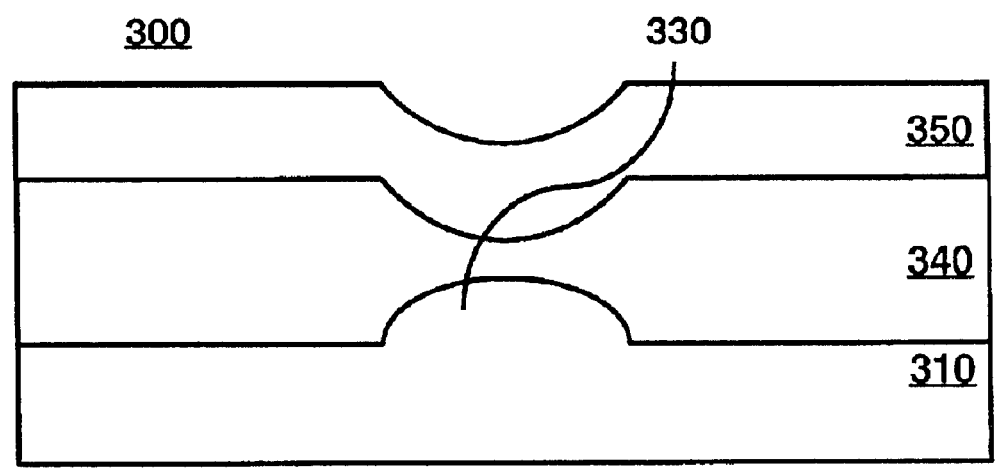

FIGS. 3A and 3B illustrate cross sections of fifth and sixth embodiments of an exemplary FEMIS electron emitter 300 according to another aspect of the present invention. The fifth and sixth embodiments may include many of the same features described herein with respect to first and second embodiments, respectively, of FIGS. 1A and 1B. For example, the electron emitter 300 may include a conductive substrate 310 (at least one protrusion 130, see FIG. 3A), optionally an electron supply layer 320 with at least one protrusion 330 (see FIG. 3B), an insulator 340, and a top conductive layer 350. Only those elements distinguishable amongst the embodiments are described.

Regarding the electron emitter 300, the shape of the insulator 340 is such that a horizontal hourglass shape is formed near any given protrusion 330. Focusing of the emitted electron beam may be further improved with such structure. The same arguments with respect to limits on the thickness of the insulator 340 above the protrusion(s) 330 still pertain.

Figure 4A:
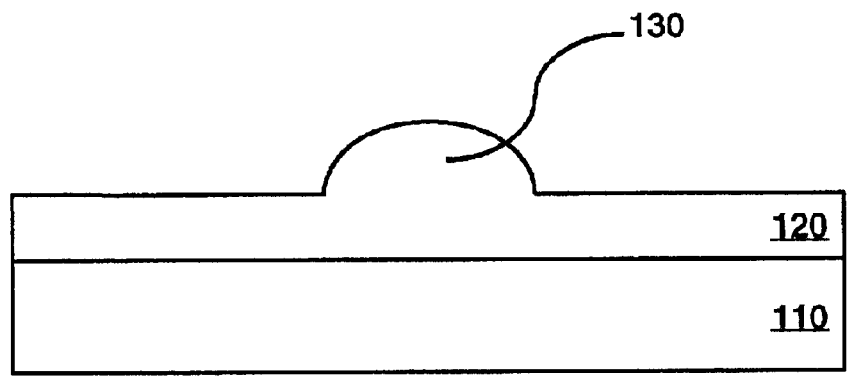
FIGS. 4A–4C collectively illustrate an exemplary method of fabricating the first embodiment of the electron emitter shown in FIG. 1A.
Figure 4B:
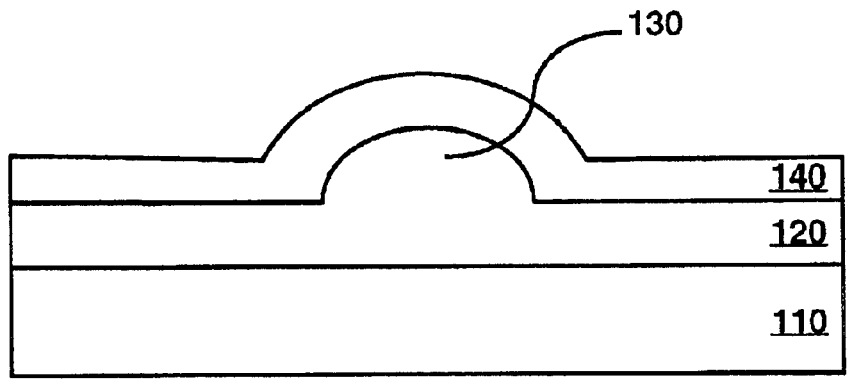
Figure 4C:
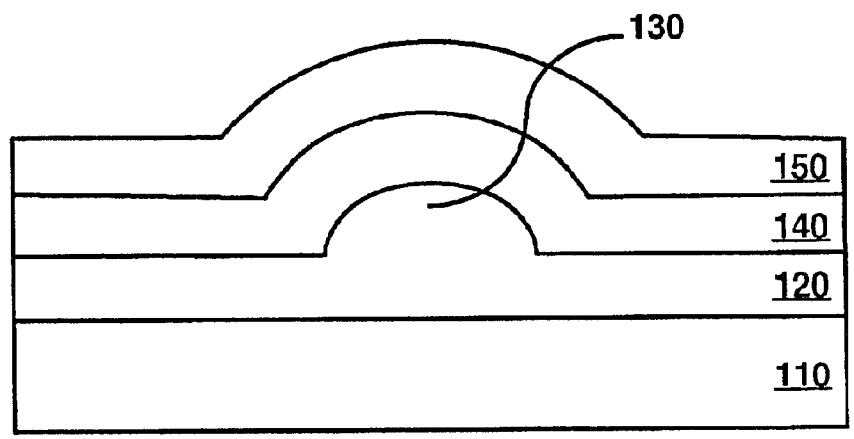

FIGS. 4A–4C collectively illustrate a method of fabricating the first embodiment of the electron emitter 100 shown in FIG. 1A. As shown in FIG. 4A, the conductive substrate 110 may be formed. Protrusions 130 may be formed at this point as part of forming the conductive substrate 110 (not shown). Optionally the electron supply layer 120 may be formed above the conductive substrate 110 and the protrusion(s) 130 may be formed as part of the forming the electron supply layer 120. Note that the top of the conductive substrate 110 may be planarized using commonly known techniques such as CMP prior to forming the electron supply layer 120.

If polysilicon is used to form the electron supply layer 120, the polysilicon, including the protrusion(s) 130, may be grown on the conductive substrate 110 by low pressure chemical-vapor-deposition (LPCVD). A preferred temperature when performing LPCVD is substantially between 550° C. and 620° C. The preferred thickness of the polysilicon may range substantially between 0.05 $\mu$m and 1 $\mu$m. The polysilicon may be grown through other deposition processes such as plasma-enhanced chemical-vapor-deposition (PECVD), other CVD variations, or physical vapor deposition (PVD) techniques that include sputter deposition and evaporation.

The electron supply layer 120, including the protrusion(s) 130, may be doped or undoped. As an option, the electron supply layer 120, such as the polysilicon, may be doped through incorporation of an n-type dopant such as phosphorous, arsenic or antimony during deposition of the polysilicon. One of ordinary skill will realize that other types of dopants are possible. The dopant concentration may be modified over time so that different depth levels of the electron supply layer 120 have varying dopant levels. Alternatively, ion implantation and subsequent annealing may also be used for either uniform or graded dopant incorporation after the electron supply layer 120 has been formed.

After the electron supply layer 120 (or the conductive substrate 110) is formed, the insulator 140 may be formed above the electron supply layer 120 as shown in FIG. 4B. When the insulator 140 is formed, the electron supply layer 120 (or the conductive substrate 110) and the protrusion(s) 130 become substantially conformally covered, i.e., any given protrusion 130 becomes internal to the emitter structure. Any given protrusion 130 is consequently not exposed to vacuum and therefore becomes relatively insensitive to the vagaries of the vacuum environment during operation of the electron emitter. As a result, vacuum requirements are relaxed.

Indeed, the insulator 140 may be formed through oxidizing the polysilicon, for example, by rapid oxidation in a dry oxygen atmosphere at a temperature substantially ranging between 800° C. and 1000° C. and time substantially between 5 and 60 minutes. Other methods of oxidation include but are not limited to plasma oxidation, wet thermal oxidation, and electrochemical oxidation.

To complete the process, the top conductive layer 150 may be formed above the insulator 140 to fabricate the FEMIS electron emitter 100, as shown in FIG. 4C.

Figure 5A:
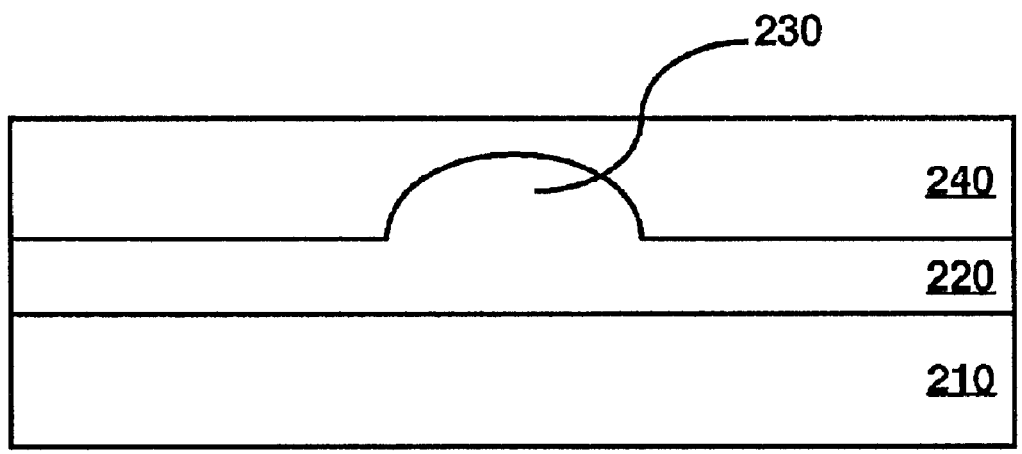
FIGS. 5A–5B collectively illustrate an exemplary method of fabricating the third embodiment of the electron emitter shown in FIG. 2A.
Figure 5B:
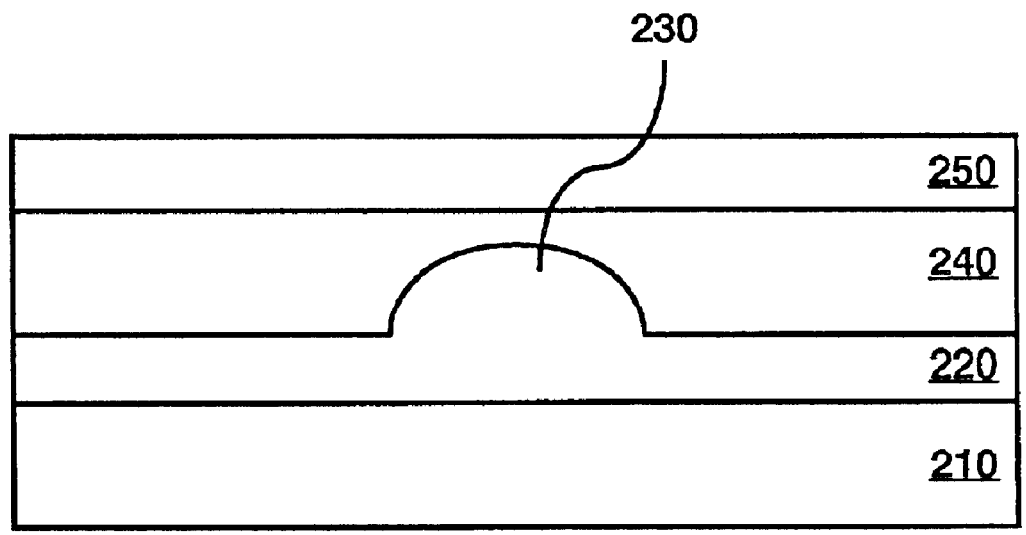

FIGS. 5A–5B collectively illustrate a method of fabricating the third embodiment of the electron emitter 200 shown in FIG. 2A. The fabrication step shown in FIG. 4A is substantially similar to that for this third embodiment and thus need not be described in detail. FIG. 5A departs from FIG. 4B in that instead of the forming an insulator that is relatively bumped at the top, a substantially flat insulator 240 is formed. The relatively thin region of the insulator 240 is near any given protrusion 230.

Subsequent to forming the insulator 240, the top conductive layer 250 may be formed above the insulator 240 to fabricate the third and fourth embodiments of the FEMIS electron emitter 200, as shown in FIG. 5B. Note that the top conductive layer 250 is substantially flat.

Figure 6A:
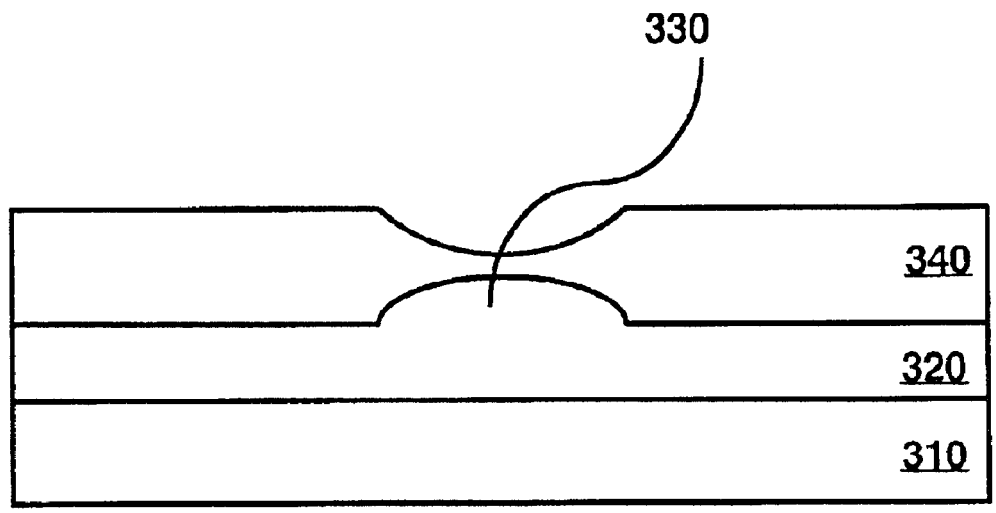
FIGS. 6A–6B collectively illustrate an exemplary method of fabricating the fifth embodiment of an electron emitter shown in FIG. 3A.
Figure 6B:
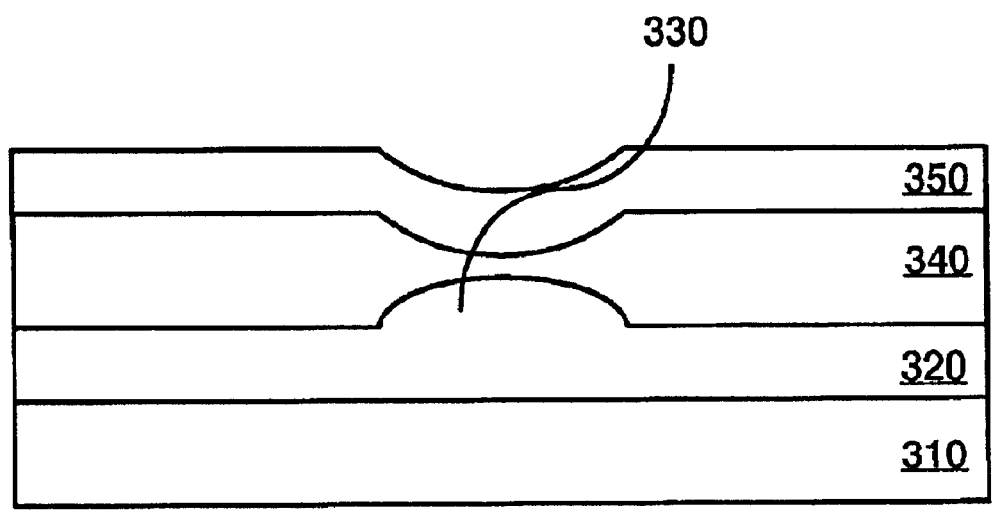

FIGS. 6A–6B collectively illustrate a method of fabricating the fifth embodiment of the electron emitter 300 shown in FIG. 3A. The fabrication step shown in FIG. 4A is substantially similar to that in this fifth embodiment and thus need not be shown in detail. FIG. 6A departs from FIG. 4B in that instead of forming an insulator that is relatively bumped at the top, an hourglass-shaped insulator 340 is formed. Any given relatively thin region of the insulator 340 may be adjacent to any given protrusion 330.

Subsequent to forming the insulator 340, the top conductive layer 350 may be formed above the insulator 340 to fabricate the fifth and sixth embodiments of the FEMIS electron emitter 300, as shown in FIG. 6B. Note that the top conductive layer 350 preferably conforms to the shape of the insulator 340.

While the invention has been described with reference to the exemplary embodiments thereof, those skilled in the art will not be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A field-enhanced MIS/MIM electron emitter device, comprising:
   an electron supply structure;
   at least one protrusion formed on a top surface of said electron supply structure;
   an insulator formed above said electron supply structure and said at least one protrusion, wherein the insulator includes at least one protrusion that substantially conforms to the at least one protrusion of the electron supply structure; and
   a top conductive layer formed on said insulator.

2. The device of claim 1, wherein said electron supply structure comprises a conductive substrate.

3. The device of claim 2, wherein said conductive substrate is formed from at least one of metal, doped polysilicon, doped silicon, graphite, a metal coating on glass, a metal coating on ceramic, a metal coating on plastic, an ITO coating on glass, an ITO coating on ceramic, and an ITO coating on plastic.

4. The device of claim 3, wherein said metal or said metal coating includes at least one of aluminum, tungsten, titanium, copper, gold, tantalum, platinum, iridium, palladium, rhodium, chromium, magnesium, scandium, yttrium, vanadium, zirconium, niobium, molybdenum, silicon, beryllium, hafnium, silver, and osmium and alloys and multilayered films thereof.

5. The device of claim 3, wherein at least one of said metal coating and said no coating is patterned.

6. The device of claim 1, wherein said electron supply structure further comprises:
   an electron supply layer formed above said conductive substrate.

7. The device of claim 6, wherein said electron supply layer is formed from one of a doped and an undoped semiconductor.

8. The device of claim 7, wherein said doped semiconductor is a doped polysilicon and said undoped semiconductor is an undoped polysilicon.

9. The device of claim 7, wherein for said doped semiconductor, selected areas of said doped semiconductor are doped.

10. The device of claim 7, wherein for said doped semiconductor, a doping level of said doped semiconductor varies in a depth direction.

11. The device of claim 1, wherein said insulator is formed from at least one of diamond-like carbon and oxides, nitrides, carbides, and oxynitrides of silicon, aluminum, titanium, tantalum, tungsten, hafnium, zirconium, vanadium, niobium, molybdenum, chromium, yttrium, scandium, nickel, cobalt, beryllium, and magnesium.

12. The device of claim 1, wherein said top conductive layer is formed from at least one of a metal, doped polysilicon, graphite, and alloys, and multilayered films thereof.

13. The device of claim 12, wherein said metal includes at least one of aluminum, tungsten, titanium, molybdenum titanium, copper, gold, silver, tantalum, platinum, iridium, palladium, rhodium, chromium, magnesium, scandium, yttrium, vanadium, zirconium, niobium, molybdenum, hafnium, silver, and osmium and any alloys and multilayered films thereof.

14. The device of claim 1, wherein said top conductive layer is patterned.

15. The device of claim 1, wherein the protrusion of the insulator extends upwards from flat regions of the insulator.

16. The device of claim 15, wherein the insulator has substantially the same thickness at the at least one protrusion of the insulator and at the flat regions.

17. The device of claim 15, wherein the at least one protrusion of the electron supply structure is rounded.

18. A method of fabricating a field-enhanced MIS/MIM electron emitter device, comprising:
   forming an electron supply structure;
   forming at least one protrusion on a top side of said electron supply structure;
   forming an insulator on said electron supply structure and said at least one protrusion, such that said insulator is relatively thinner near said at least one protrusion compared to a flat region of said electron supply structure and said insulator has an hourglass shape local to said at least one protrusion; and
   forming a top conductive layer on said insulator.

19. The method of claim 18, wherein said step of forming said electron supply structure includes:
   forming a conductive substrate.

20. The method of claim 19, wherein said step of forming said electron supply structure includes:
   forming an electron supply layer above said conductive substrate.

21. The method of claim 20, wherein said electron supply layer is formed from one of a doped and an undoped semiconductor.

22. The method of claim 21, wherein said doped semiconductor is a doped polysilicon and said undoped semiconductor is an undoped polysilicon.

23. The method of claim 21, wherein said forming said doped semiconductor includes:

doping said semiconductor in selected areas.

24. The method of claim 21, wherein forming said doped semiconductor includes:

varying a doping level in a depth direction.

25. The method of claim of 22, wherein said step of forming said polysilicon includes:

depositing said polysilicon by at least one of LPCVD, PVD, PECVD and other CVD variants.

26. The method of claim 22, wherein said step of forming said insulator includes:

oxidizing said polysilicon and said at least one protrusion thereon.

27. The method of claim 26, wherein oxidizing step includes:

oxidizing said polysilicon and said at least one protrusion thereon by at least one of plasma oxidation, wet thermal oxidation, dry thermal oxidation, and electrochemical oxidation.

28. The method of claim 19, wherein said conductive substrate is formed from at least one of a metal, doped polysilicon, doped silicon, graphite, a metal coating on glass, a metal coating on ceramic, a metal coating on plastic, an ITO coating on glass, an ITO coating on ceramic, an ITO coating on plastic, and combinations thereof.

29. The method of claim 28, wherein said metal or metal coating includes at least one of aluminum, tungsten, titanium, copper, gold, tantalum, platinum, iridium, palladium, rhodium, chromium, magnesium, scandium, yttrium, vanadium, zirconium, niobium, molybdenum, silicon, beryllium, hafnium, silver, and osmium and any alloys, and multilayered films thereof.

30. The method of claim 28, wherein said step of forming said conductive substrate includes:

patterning at least one of said metal coating and said ITO coating.

31. The method of claim 18, wherein said insulator is formed from at least one of a diamond-like carbon, oxides, nitrides, carbides and oxynitrides of silicon, aluminum, titanium, tantalum, tungsten, hafnium, zirconium, vanadium, niobium, molybdenum, chromium, yttrium, scandium, nickel, cobalt, beryllium, magnesium, and combinations thereof.

32. The method of claim 18, wherein said top conductive layer is formed from at least one of a metal, doped polysilicon, graphite, and alloys or multilayered films thereof.

33. The method of claim 32, wherein said metal includes at least one of aluminum, tungsten, titanium, molybdenum titanium, copper, gold, silver, tantalum, platinum, iridium, palladium, rhodium, chromium, magnesium, scandium, yttrium, vanadium, zirconium, niobium, molybdenum, hafnium, silver, and osmium and any alloys and multilayered films thereof.

34. The method of claim 18, wherein said forming said top conductor comprises:

patterning said top conductor.

35. The method of claim 18, wherein forming an insulator comprises:

forming the insulator, wherein the hourglass shape is substantially symmetrical along a horizontal axis.

36. The method of claim 18, wherein forming an insulator comprises:

forming the insulator, wherein the at least one protrusion is rounded.

37. An electron emitter device, comprising:

an electron supply structure;

at least one protrusion formed on a top surface of said electron supply structure;

an insulator formed above said electron supply structure and said at least one protrusion, wherein the insulator has an hourglass shape local to said at least one protrusion; and a top conductive layer formed on said insulator.

38. The device of claim 37, wherein the hourglass shape is substantially symmetrical along a horizontal axis.

39. The device of claim 37, wherein the at least one protrusion is rounded.

40. A method of fabricating an electron emitter device, comprising:

forming an electron supply structure;

forming at least one protrusion on a top side of said electron supply structure;

forming an insulator on said electron supply structure and said at least one protrusion, wherein the insulator includes at least one protrusion that substantially conforms to the at least one protrusion of the electron supply structure; and forming a top conductive layer on said insulator.

41. The method of claim 40, wherein forming an insulator comprises:

forming the insulator, wherein the at least one protrusion of the insulator extends upwards from flat regions of the insulator.

42. The method of claim 41, wherein forming an insulator comprises:

forming the insulator, wherein the insulator has substantially the same thickness at the at least one protrusion of the insulator and at the flat regions.

43. The method of claim 40, wherein forming the at least one protrusion comprises:

forming the at least one protrusion, wherein the at least one protrusion is rounded.

* * * * *